United States Patent [19]

West

[11] Patent Number: 4,848,393
[45] Date of Patent: Jul. 18, 1989

[54] FAULT TOLERANT FLUID FLOW APPARATUS

[76] Inventor: Robert E. West, 3200 Carlisle, NE., Ste. 217, Albuquerque, N. Mex. 87110

[21] Appl. No.: 140,765

[22] Filed: Jan. 4, 1988

Related U.S. Application Data

[63] Continuation-in-part of Ser. No. 879,411, Jun. 27, 1986, Pat. No. 4,716,923.

[51] Int. Cl.⁴ .............................................. F16K 11/10
[52] U.S. Cl. ............................. 137/312; 137/599/884
[58] Field of Search ........................ 137/312, 599, 884

[56] References Cited

U.S. PATENT DOCUMENTS

| Re. 31,161 | 3/1983 | Mahorney | 137/596.16 |
|---|---|---|---|
| 1,246,803 | 11/1917 | Doti | 137/599 |
| 1,253,344 | 1/1918 | Braun | 137/599 X |
| 1,378,348 | 5/1921 | Hartwell | 137/567 X |
| 1,945,684 | 2/1934 | Glab | 137/599 X |
| 2,182,724 | 12/1939 | Hennessy | 137/78 |
| 2,284,560 | 5/1942 | Corneil | 137/599 X |
| 2,476,519 | 7/1949 | Van Der Werff | 137/144 |
| 3,135,282 | 6/1964 | Gray | 137/567 X |
| 3,244,193 | 4/1966 | Loveless | 137/454.6 |
| 3,318,329 | 5/1967 | Norwood | 137/599 |
| 3,538,947 | 10/1970 | Leiber et al. | 137/550 |
| 4,045,119 | 11/1977 | Allen | 137/315 |
| 4,355,659 | 10/1982 | Kelchner | 137/625.19 |
| 4,425,930 | 1/1984 | Kruto | 137/1 |
| 4,473,095 | 9/1984 | Motzer | 137/596.16 |
| 4,501,295 | 2/1985 | Williams et al. | 137/599.1 X |
| 4,529,006 | 7/1985 | Block et al. | 137/625.65 |

*Primary Examiner*—Gerald A. Michalsky
*Attorney, Agent, or Firm*—Deborah A. Peacock; Robert W. Weig

[57] ABSTRACT

The disclosure is directed to a fault tolerant fluid flow apparatus which will continue to function during a malfunction of a valve utilized therein. The disclosed apparatus uses parallel arms, each containing serially connected valves and may be incorporated in a manifold. One embodiment utilizes an inlet and outlet switching valve so that one of the parallel arms can be closed off from fluid flow for service of a valve therein.

12 Claims, 6 Drawing Sheets

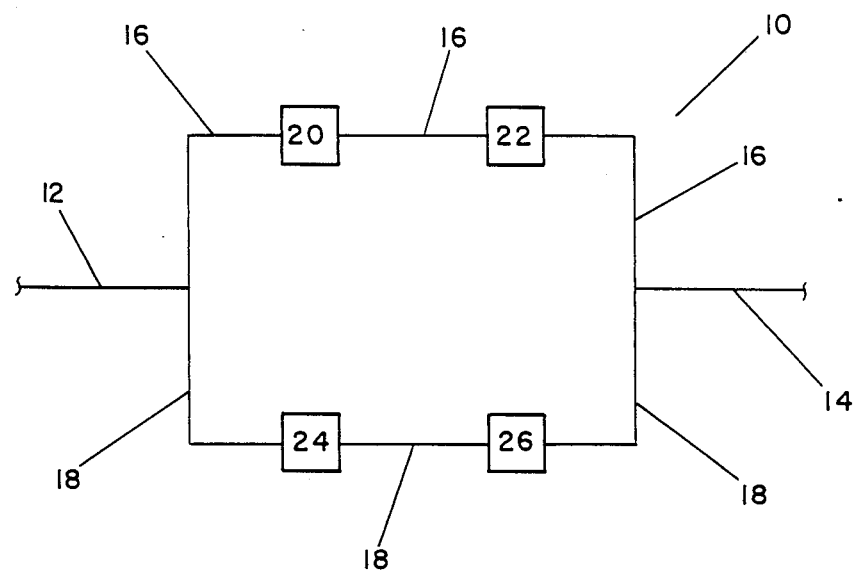
FIG—1

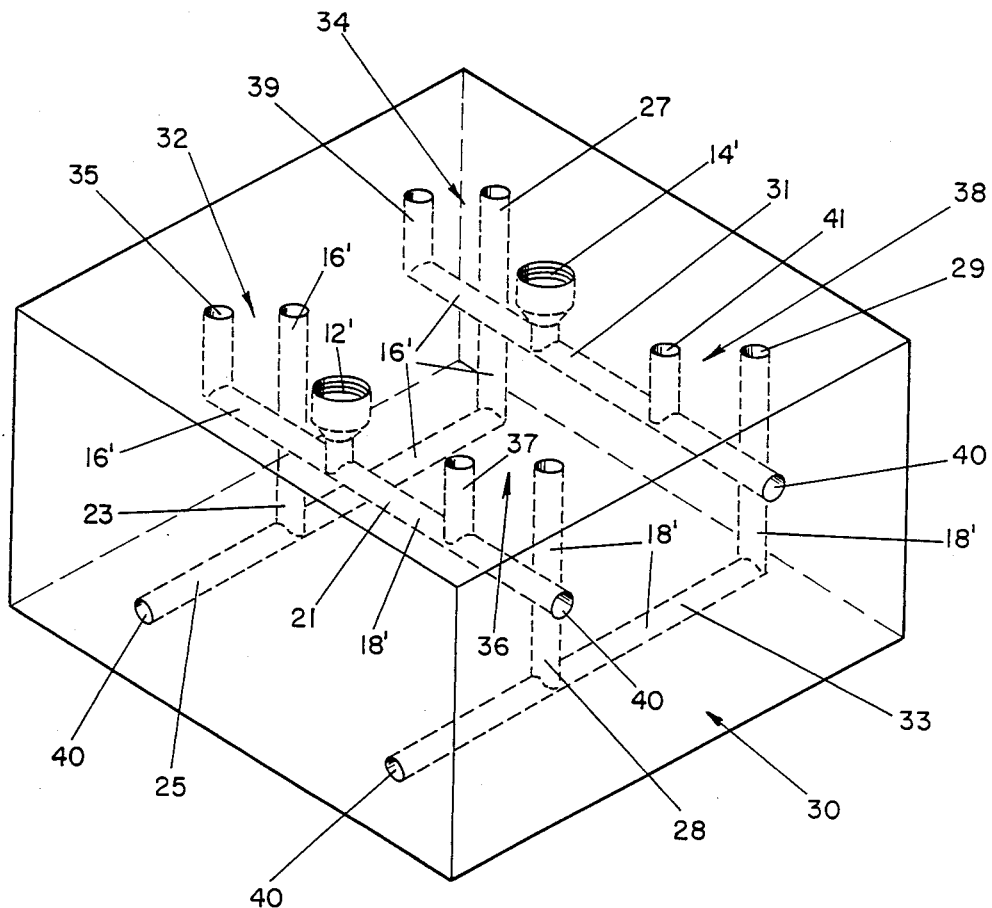
FIG — 2

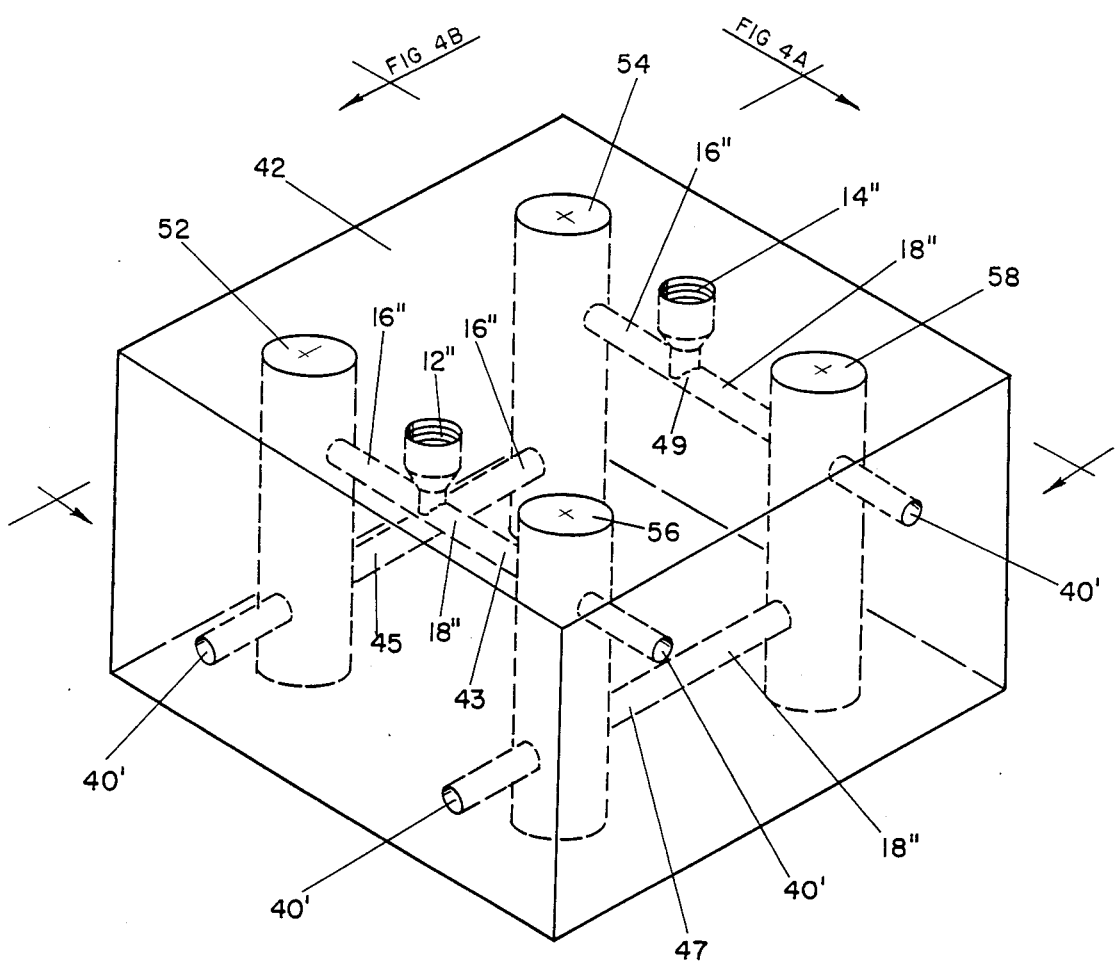
FIG — 3

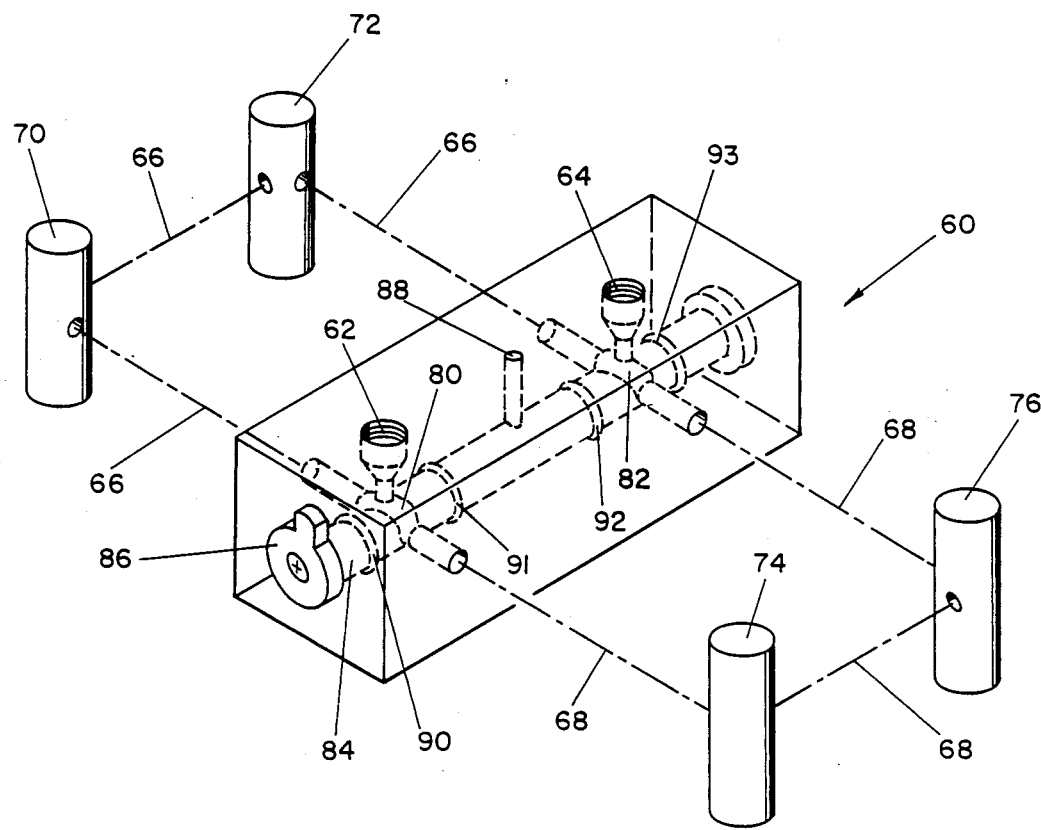
FIG—5

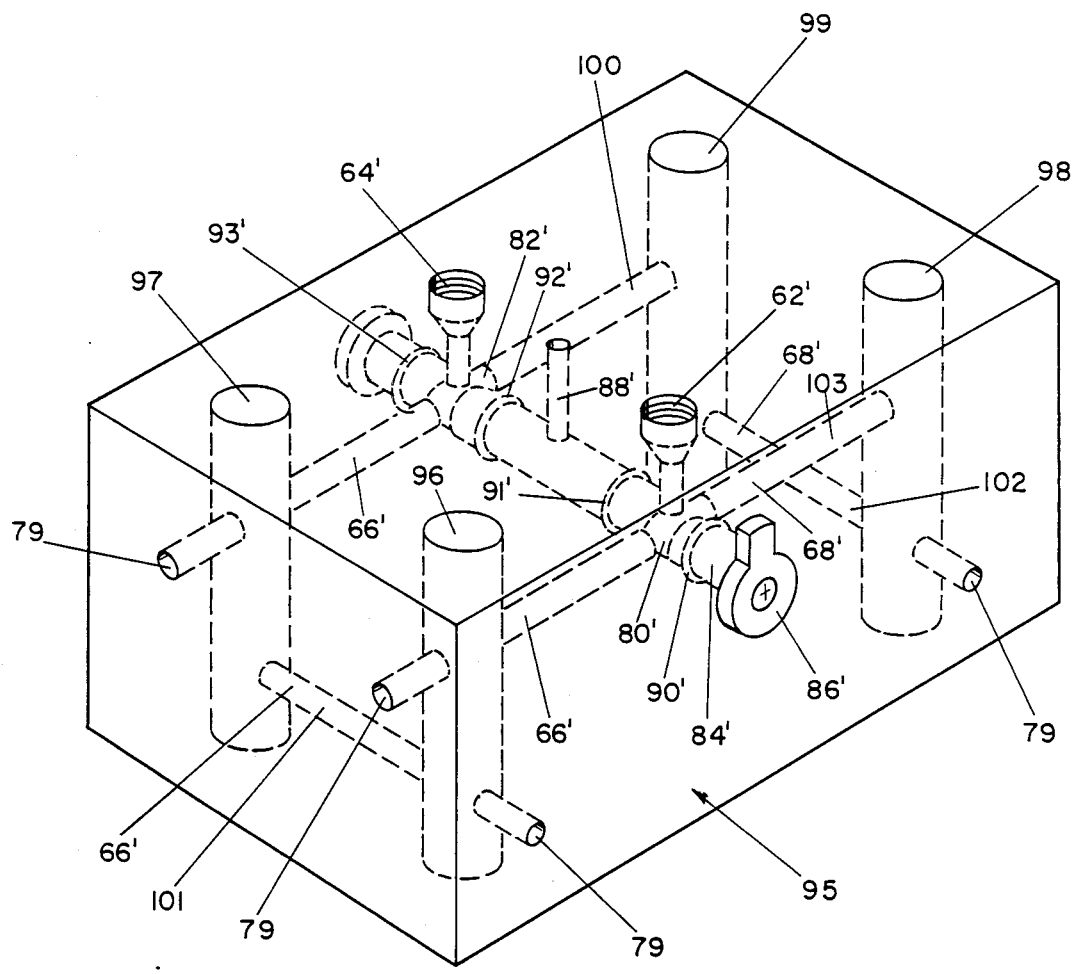
FIG—6

FAULT TOLERANT FLUID FLOW APPARATUS

CROSS-REFERENCE TO A RELATED APPLICATION

This application is a continuation-in-part of U.S. patent application Ser. No. 879,411, entitled APPARATUS FOR MANIPULATING PARALLEL FLUID FLOW CIRCUITS, filed on June 27, 1986, now U.S. Pat. No. 4,716,923, the teachings of which are incorporated herein.

FIELD OF THE INVENTION

The invention relates to fault tolerant devices and more particularly to parallel and serial fault tolerant fluid flow devices. In practicing the invention, fluids can comprise gaseous and liquid states and vapors and can be involved in sundry processes and transmissions.

BACKGROUND OF THE INVENTION

There is a continuing need in the fluid flow arts, such as petroleum and chemical processing, power generation, aerospace and transportation, and the like, for reliable, continuous system operation. Shutting down systems or having systems break down are events which are expensive and even dangerous. Thus, these industries frequently rely on redundancy in their systems for minimum shutdown times and occurrences and for safety.

Many redundant systems exist for fluid flow. Most such systems require duplicate or triplicate fluid flow valves and conduit structures. While such systems may increase the reliability of continuing operation, they are excessively complicated, expensive, and must frequently be maintained by highly skilled personnel. Many such systems rely on components therein which are difficult to access and replace. Thus, maintenance may be deferred by the operators of such systems until redundancy is lost and an actual breakdown occurs.

SUMMARY OF THE INVENTION

In accordance with the invention, one embodiment thereof comprises a fault tolerant parallel and serial fluid flow apparatus comprising an inlet and an outlet, at least two parallel fluid flow arms, each arm communicating between the inlet and the outlet, and at least two fluid flow controlling valves serially disposed within each arm. Each valve is capable of controlling fluid flow from full throughput of fluid flow at a fully open position to no fluid flow at a fully closed position. Fluid flow can be continued through one of the parallel arms and thereby through the apparatus during the malfunction of a valve in the other arm. The fluid flow arms can be disposed within a manifold and one or more valves can also be disposed within said manifold. Alternatively, one or more valves can be mounted upon the manifold to operably communicate with a parallel arm disposed therein.

Another embodiment of the invention comprises a fault tolerant parallel and serial fluid flow apparatus comprising an inlet and an outlet, at least two parallel fluid flow arms, each arm comprising at least two serially disposed valves, each valve being capable of controlling fluid flow from full throughput of fluid flow at a fully open position to no fluid flow at a fully closed position. A switching valve structure is positioned between the inlet and the parallel fluid flow arms for selectively controlling fluid flow from the inlet to the arms. The inlet controlling valve structure is capable of directing fluid flow from the inlet to both the parallel arms simultaneously and to each arm individually, such that fluid flow to one arm can be stopped for service of a valve therein. A second switching valve structure can be positioned between the outlet and the parallel fluid flow arms for selectively controlling fluid flow from the arms to the outlet. The outlet controlling structure is preferably capable of directing fluid flow to the outlet from both of the parallel arms simultaneously and from each arm individually, such that fluid flow to the outlet from one arm can be stopped for service of a valve therein. The inlet and outlet controlling valve structures are preferably simultaneously and cooperatively controllable. Leakage detection means, such as a vent, can be disposed to communicate with the inlet and outlet controlling valve structures.

Accordingly, it is an object of the invention to increase fluid system reliability in the face of component valve failure.

Another object of the present invention is to provide fault tolerant fluid flow utilizing a structure enabling valve replacement without system shutdown.

It is another object of the invention to provide both parallel and serial fault tolerant fluid flow.

One advantage of utilizing the instant invention within a fluid system is that fluid flow and system operation can be continued after a valve malfunctions.

Another advantage of the present invention is that in accordance therewith, fluid flow within an operating system can be continuously maintained during valve replacement or repair therein.

Yet another advantage of the instant invention is that relatively unskilled individuals can readily maintain devices incorporating the invention.

Other objects, advantages and novel features, and further novel scopes of the present invention will be set forth in part in the detailed description to follow, taken in conjunction with the accompanying drawings, and in part will become apparent to those skilled in the art upon examination of the following, and may be learned by practice of the invention. The objects and advantages of the invention may be realized and attained by means of the instrumentalities and combinations particularly pointed out in the appended claims.

The accompanying drawings, which are incorporated into and form a part of the specification, illustrate several embodiments of the present invention and, together with the description, serve to explain the principles of the invention.

BRIEF DESCRIPTION OF THE DRAWINGS

FIG. 1 schematically illustrates an embodiment of the invention;

FIG. 2 shows the FIG. 1 embodiment in a manifold with valves mountable thereon;

FIG. 3 depicts the FIG. 1 embodiment with fluid conduit and valves disposed in a manifold;

FIG. 5 schematically represents another embodiment of the invention; and

FIG. 6 illustrates the FIG. 5 embodiment in a manifold.

DETAILED DESCRIPTION OF THE INVENTION

Figure 4A:
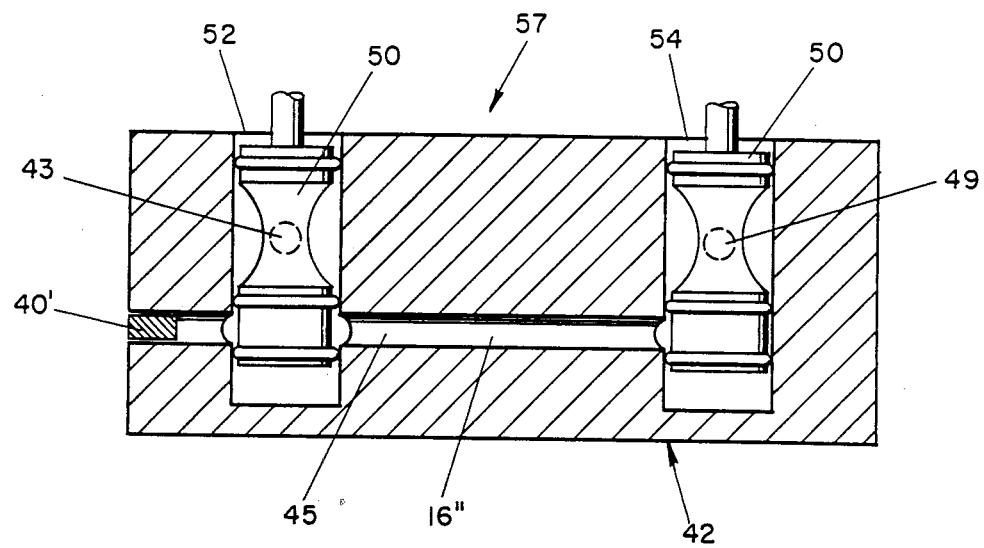
FIGS. 4A and 4B show valves usable in the FIG. 3 manifold.

Reference is now made to FIG. 1 which is a schematic representation of an embodiment 10 of the invention. As seen therein, an inlet conduit 12 and an outlet conduit 14 conduct fluid to and from a pair of parallel fluid flow arms 16 and 18, which comprise pairs of serially connected valves 20 and 22 and 24 and 26, respectively. In operation, typically, all of the valves 20, 22, 24 and 26 are opened and closed simultaneously. During such simultaneous valve operation of the FIG. 1 embodiment, if any of the valve malfunctions in a closed position, fluid flow continues through the other parallel arm. For example, if valve 26 in arm 18 can not be opened when the other valves are opened from a closed position, fluid flows through valves 20 and 22 in arm 16. If a valve sticks in an open or partially open position, its serially connected valve can still be closed, if desired, to terminate fluid flow in the parallel arm containing the malfunctioning valve. Thus, if valve 20 sticks in open position during a valve closing step, valve 22 acts to shut fluid flow in arm 16. In order to prevent fouling during operation under harsh conditions, the valves may be individually cycled using, for example, a sequencing controller, to maintain their ability to function. The embodiments of the invention disclosed herein provide for maintaining fluid flow during such operations.

The FIG. 1 embodiment representing a parallel and serial fault tolerant apparatus in accordance with the invention shows two parallel arms and two serially connected valves in each arm. Those skilled in the art will appreciate that, in practicing the invention, more than two parallel arms can be used and that each parallel arm can contain more than two serially connected valves. Valves used in practicing the invention can be on-off type valves, such as solenoid valves as well as analog or digitally controlled, variably openable, flow regulating valves. Valve sizing can be directed to any particular application.

Figure 4B:
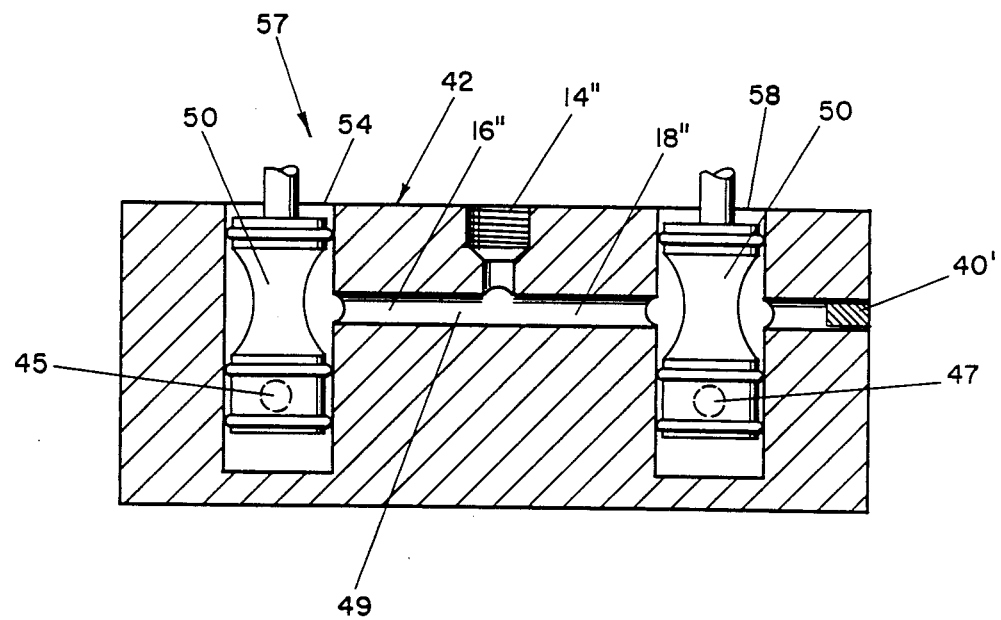

FIGS. 2 and 3 show exemplary manifolds for practicing the invention. In the FIG. 2 embodiment, four valves (not shown) are positionable on a manifold 30 at areas 32, 34, 36 and 38 which correspond to the positions of valves 20, 22, 24 and 26 in FIG. 1. Parallel arms 16' and 18' comprising bore holes 21, 23, 25, 27, 28, 29, 31, 33, 35, 37, 39 and 41 in manifold 30 communicate between inlet port 12' and exit port 14'. Bore holes, as appropriate, are closed with plugs 40, as is conventional in the art in both manifolds. FIG. 3 also shows a valve containing manifold 42 providing the parallel and serial fault tolerant apparatus of FIG. 1. Conventional solenoid spool valves 50, such as those seen in FIGS. 4A and 4B, for example, are cross sections, as indicated, from the FIG. 3 manifold 42. FIG. 4A shows valves 50, in series, in their "closed" position. They can be moved into "open" position by moving them in the direction of arrow 57 by means well known in the art. Parallel arms 16" and 18" extend through manifold 42 between inlet 12" and outlet 14" through bore holes 43, 45, 47 and 49 appropriately plugged with plugs 40'. Valves 50 fit in sleeves 52, 54, 56 and 58. The FIG. 3 embodiment functions as explained with reference to FIGS. 1 and 2.

Another embodiment 60 is illustrated in FIG. 5. This embodiment comprises an inlet 62, outlet 64, parallel arms 66 and 68 comprising serial valves 70 and 72 and 74 and 76, respectively. Embodiment 60 further comprises inlet and outlet switching valves 80 and 82, which are shown in greater detail in U.S. Pat. No. 4,716,923, referred to hereinabove. Switching valves 80 and 82 preferably act cooperatively and simultaneously and are turned by a handle 86 on the end of a shaft 84. Handle 86 is shown in its middle or upright position. When in this position, valves 80 and 82 open both arms 66 and 68 to fluid flow from inlet 62 through both parallel arms 66 and 68 to outlet 64. If handle 86 is turned toward arm 66, fluid flow into and from arm 68 is stopped by valves 80 and 82, while it continues through arm 66. When handle 86 is turned toward arm 68, fluid flow into and from arm 66 is stopped by valves 80 and 82, while it continues through arm 68. A vent 88 provides leak detection if fluid escapes through inside seals 91 or 92. Seals 90 and 93 seal the switching valves 80 and 82 from the outside environment.

FIG. 6 shows the FIG. 5 embodiment within a manifold 95. Solenoid spool valves, such as the valves 50 illustrated in FIGS. 4A and 4B, can be used in sleeves 96, 97, 98 and 99. Bore holes 100, 101, 102 and 103 form arm 66', containing valves 96 and 97, and arm 68', containing valves 98 and 99. Bore holes are appropriately plugged using plugs 79. Inlet 62', outlet 64' and vent 88', valves 80' and 82', as well as seals 90', 91', 92' and 93' correspond to their like numbered unprimed counterparts in the FIG. 5 embodiment. The manifold embodiment of FIG. 6 functions as the FIG. 5 embodiment.

The FIG. 5 and FIG. 6 embodiments are advantageously used in applications requiring minimum downtime in that by using the inlet and outlet switching valves 80 and 82 and 80' and 82', a malfunctioning valve on one of the arms can be removed for repair or replaced without shutting down fluid flow through the apparatus. This is because one arm can be removed from service by closing it off from both the inlet and the outlet. Fluid flow continues through the other arm. Leakage detection with regard to valves 80 and 82 and 80' and 82' is also accomplished in the FIG. 5 and FIG. 6 embodiments with vents 88 and 88'. The FIG. 5 embodiment could also be practiced using a manifold having externally mounted valves such as shown in FIG. 3.

The invention can be practiced using three-way valves and four-way valves as well as two-way valves described with reference to the specific exemplary embodiments of the invention disclosed herein.

A diagnostic system can be incorporated into the invention to detect a fouled fluid conduit or non-operative valve or clog, and provide an alarm. The diagnostic system could also be used to operate switch handle 86 or 86', in the FIG. 5 and FIG. 6 embodiments.

The invention has been described in detail with particular reference to certain embodiments thereof, but it will be understood that variations and modifications can be effected within the scope of the invention.

I claim:

1. A fault tolerant parallel and serial fluid flow apparatus comprising:
   (a) an inlet and an outlet;
   (b) at least two parallel fluid flow arms, each said arm comprising at least two serially disposed valves, each said valve being capable of controlling fluid flow from full throughput of fluid flow at a fully open position to no fluid flow at a fully closed position;
   (c) means positioned between said inlet and said parallel fluid flow arms for selectively controlling fluid flow from said inlet to each of said arms, said inlet controlling means being capable of directing fluid flow from said inlet to both said parallel arms simultaneously and to each said arm individually, such that fluid flow to one said arm can be stopped for service of a valve therein.

2. The invention of claim 1 further comprising means positioned between said outlet and said parallel fluid flow arms for selectively controlling fluid flow from each of said arms to said outlet, said outlet controlling means being capable of directing fluid flow to said outlet from both said parallel arms simultaneously and from each said arm individually, such that fluid flow to said outlet from one of said arms can be stopped for removal of a valve therein.

3. The invention of claim 2 further comprising means for simultaneously and cooperatively operating said inlet controlling means and said outlet controlling means.

4. The invention of claim 3 further comprising leakage detection means communicating with said inlet controlling means and said outlet controlling means.

5. The invention of claim 4 wherein said leakage detection means comprises vent means.

6. The invention of claim 1 wherein said fluid flow arms are disposed within a manifold.

7. The invention of claim 6 wherein at least one said valve is also disposed within said manifold.

8. The invention of claim 6 wherein at least one said valve is mountable upon said manifold to operably communicate with a parallel arm disposed therein.

9. The invention of claim 6 further comprising means positioned between said outlet and said parallel fluid flow arms for selectively controlling fluid flow from each of said arms to said outlet, said outlet controlling means being capable of directing fluid flow to said outlet from both said parallel arms simultaneously and from each said arm individually, such that fluid flow to said outlet from one of said arms can be stopped for removal of a valve therein.

10. The invention of claim 9 further comprising means for simultaneously and cooperatively operating said inlet controlling means and said outlet controlling means.

11. The invention of claim 10 further comprising leakage detection means communicating with said inlet controlling means and said outlet controlling means.

12. The invention of claim 11 wherein said leakage detection means comprises vent means.

* * * * *